March 3, 1942.  A. P. BLOXSOM  2,274,821
STEERING MECHANISM
Filed Feb. 7, 1938  6 Sheets-Sheet 4

Inventor
ALLAN P. BLOXSOM.
By Jesse R. Stone
Lester D. Clark
Attorneys

March 3, 1942. A. P. BLOXSOM 2,274,821
STEERING MECHANISM
Filed Feb. 7, 1938 6 Sheets-Sheet 5

Patented Mar. 3, 1942

2,274,821

UNITED STATES PATENT OFFICE 2,274,821

STEERING MECHANISM

Allan P. Bloxsom, Houston, Tex.

Application February 7, 1938, Serial No. 189,184

5 Claims. (Cl. 280—91)

The invention relates to improvements in steering device for automotive vehicles wherein the direction in which a vehicle is propelled is controlled by a hand wheel through which the planes of rotation of the vehicle wheels are controlled.

It is an object of the invention to provide coordinated directional control of the front and rear wheels of an automotive vehicle in a manner to more effectively control the direction of travel of such vehicle.

It is also an object to provide a device of the class described wherein steering may be effected through the control of the direction of either the front or the rear wheels of the vehicle.

Another object is to provide in conjunction with conventional steering equipment a cooperating secondary steering mechanism for the control of the direction of the rear wheels of a vehicle.

Another object is the provision of novel mechanism for hydraulically steering a motor vehicle.

Still another object is the provision of a device of the class described which gives such coordinated direction of the wheels of a motor vehicle that a vehicle having a long wheel base may be turned in a short turning radius.

It is also an object to provide a steering mechanism in which the directions of the wheels of a vehicle are especially coordinated for parking.

Still another object is the provision of a steering mechanism for controlling the direction of both the front and rear wheels of a vehicle and in which the directions of the pairs of front and rear wheels are differently coordinated for different radii of turning.

Other and further objects together with the foregoing will be apparent upon consideration of the following description taken in connection with the accompanying drawings in which:

In the operation of automotive vehicles parking, passing other vehicles, turning sharp curves and negotiating gentle curves on the open road present different problems to be solved when providing suitable steering apparatus for such vehicles. This invention is concerned with such coordination in the steering of the vehicle wheels that these problems are solved.

Figure 1:
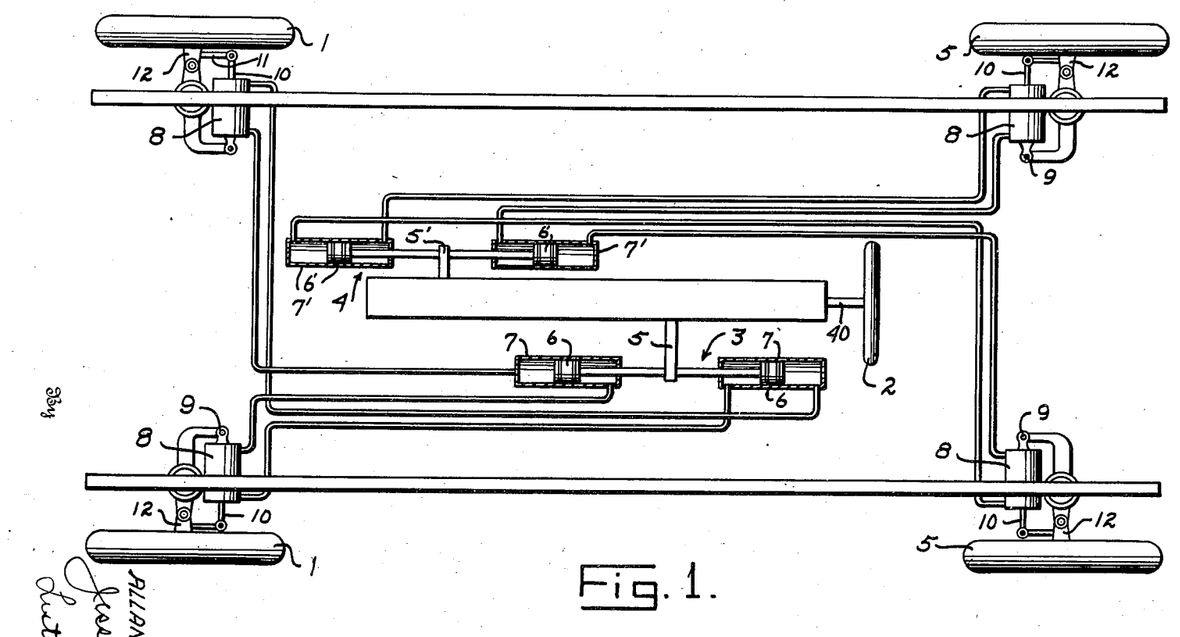
Fig. 1 is a plan view partly in section illustrating the use of the invention in an automotive vehicle.

In the conventional steering of a vehicle the front wheels are turned in a desired manner relative to the remainder of the vehicle through a steering mechanism under the control of the driver. This may be illustrated by reference to Fig. 1 showing the front wheels 1 as controlled hydraulically through the operation of the steering wheel 2 and a mechanism which is herein termed a primary steering mechanism 3. The invention includes novel structure to effect such steering but in order to solve all the problems of steering as above indicated, the invention also contemplates the provision of a secondary steering mechanism 4 controlled through the steering wheel 2 and which controls the direction of the rear wheels 5 in such coordination with the steering of the front wheels that the general objects of the invention are attained.

Figure 11:
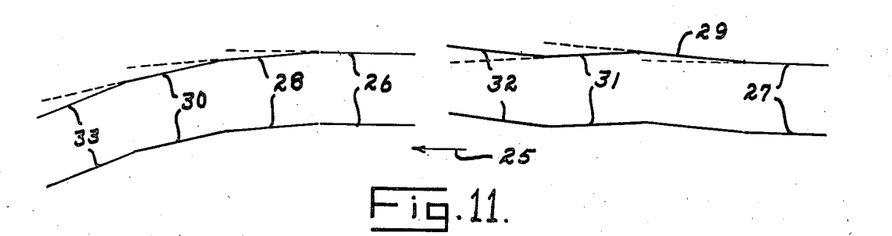
Fig. 11 illustrates the directional coordination of the front and rear wheels of a vehicle when using the present invention.
Figure 12:
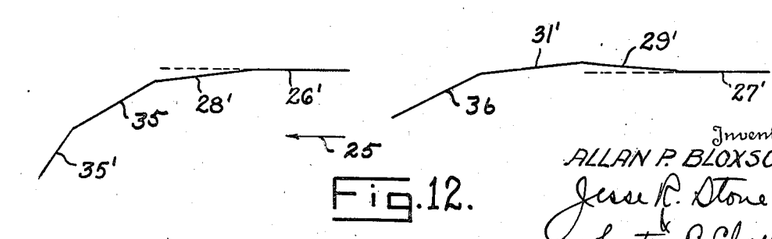
Fig. 12 illustrates the modified coordination in direction of the front and rear wheels of a vehicle when the vehicle is being parked.

In order to clearly understand the coordination of the steering movements of the front and rear wheels attained by the invention, attention is directed to Figs. 11 and 12 in which the direction of movement of the vehicle is indicated by the arrows 25. Line segments at the left in each figure illustrate the direction taken by the front wheels of the vehicle while the lines at the right similarly indicate the direction taken by the rear wheels.

Fig. 11 illustrates the conditions for ordinary driving, while Fig. 12 illustrates the conditions when parking.

When rounding a gentle curve with conventional steering the rear wheels do not follow directly behind the front wheels but rather assume a position nearer the center of the roadway than do the front wheels. This condition is undesirable, particularly in vehicles having a long wheel base as the rear end of such vehicles is brought too near the center of the roadway. It is therefore desirable that the rear wheels follow as nearly as possible the track made by the front wheels. Lines 26 and 27 and their dotted extensions illustrate wheel directions on the straightaway. On gentle curves the front wheels are turned from the line 26 to the line 28 and at the same time it is desirable that the rear wheels be turned slightly outwardly as indicated in 29 so that the front and rear of the vehicle will be equidistant from the edge of the roadway. Such coordination in direction of the front and rear wheels will prevent the rear portion of the vehicle from approaching the center of the roadway.

In encountering a curve of a shorter radius of curvature than that above indicated the front wheels are turned in the direction indicated by the lines 30. For such radius of curvature it is necessary that the wheels be turned slightly to the left in order that they will follow the front wheels. Accordingly, the rear wheels are directed as indicated by the lines 31. It should be noted that when turning within a limited radius indicated by lines 30 and 31 the front and rear wheels are substantially parallel and hence the vehicle is propelled sidewardly with little or no directional change in the body of the vehicle. This feature is consequently of importance when passing other vehicles.

When sharp turns are to be made it is well known that with conventional steering equipment the front end of the vehicle must be directed well into the roadway of the new direction of travel in order that the rear end of the vehicle will remain upon the surface of the roadway. In the present invention this difficulty is avoided by such directional coordination of the rear and front wheels that the rear wheels are turned outwardly as indicated by lines 32 when the front wheels are turned inwardly on lines 33.

When parking a vehicle it is desirable that all wheels be turned in a common direction and this condition is accomplished in accordance with the invention in a manner to be described, whereby the front and rear wheels may be turned, when parking, as indicated by lines 35 and 36 in Fig. 12.

Attention is now further directed to the mechanism of the invention whereby the desired results will be obtained.

Referring further to Fig. 1 it is to be noted that the steering wheel 2 moves arms 5 and 5' of the primary and secondary steering mechanism respectively to move pistons 6 and 6' in the cylinders 7 and 7'. Each of these cylinders directs fluid to one of the cylinders 8 pivotally connected to the vehicle frame 9 and having a piston rod 10 connected to the steering arm 11 attached to one of the wheel spindles 12. It should be noted that these cylinders are arranged in pairs and that, referring for example to cylinders 7 of the primary steering mechanism, when fluid is directed from one of the cylinders 7 to a cylinder 8, the fluid that is displaced in the cylinder 8 is returned to the other cylinder of the pair.

Figures 7, 8:
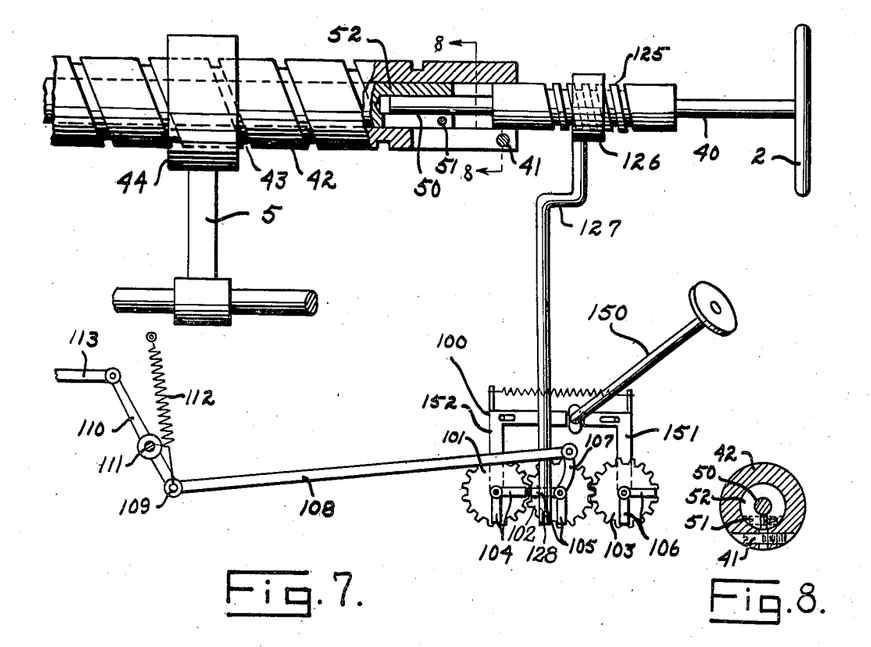
Fig. 7 is a view partly in section illustrating the primary steering mechanism and the secondary steering control.
Fig. 8 is a section taken on line 8—8 of Fig. 7.

Desired coordination in the steering of the front and rear wheels is effected by a mechanism which will now be described, such mechanism obviously being designed to effect similar coordination in movement of the arms 5 and 5'. As is best seen in Fig. 7, the steering wheel 2 is fixed to a steering shaft 40 which is releasably connected through a locking screw 41 to a driving sleeve 42 having threads 43 thereon. The arm 5 is provided with a collar 44 which is internally threaded to cooperate with the threads 43 on the drive sleeve 42. Rotation of the sleeve 42 effects movement of the arm 5 and hence directs the front wheels of a vehicle through a hydraulic system as above described.

Figures 2, 3:
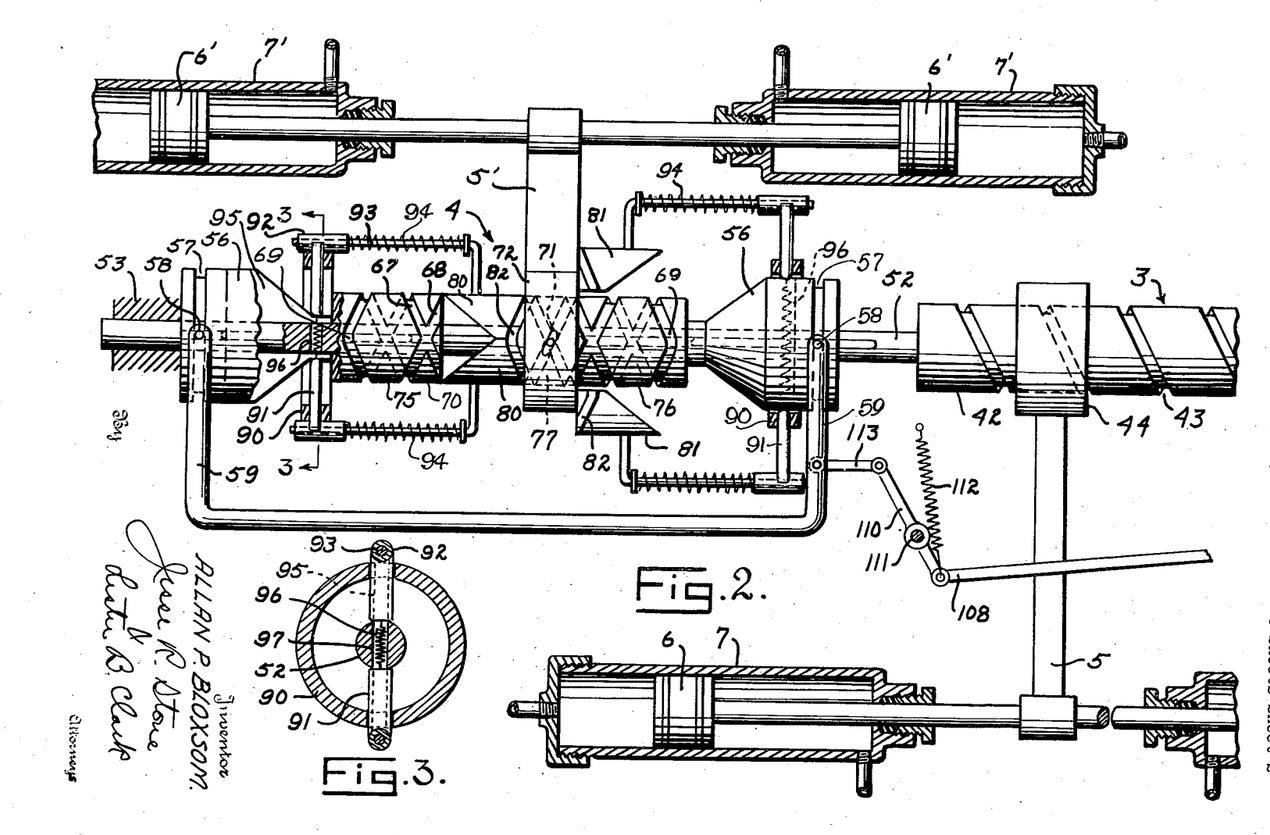
Fig. 2 illustrates constructional details in one embodiment of the invention.
Fig. 3 is a sectional view taken on line 3—3 of Fig. 2.
Figures 4, 5, 6:
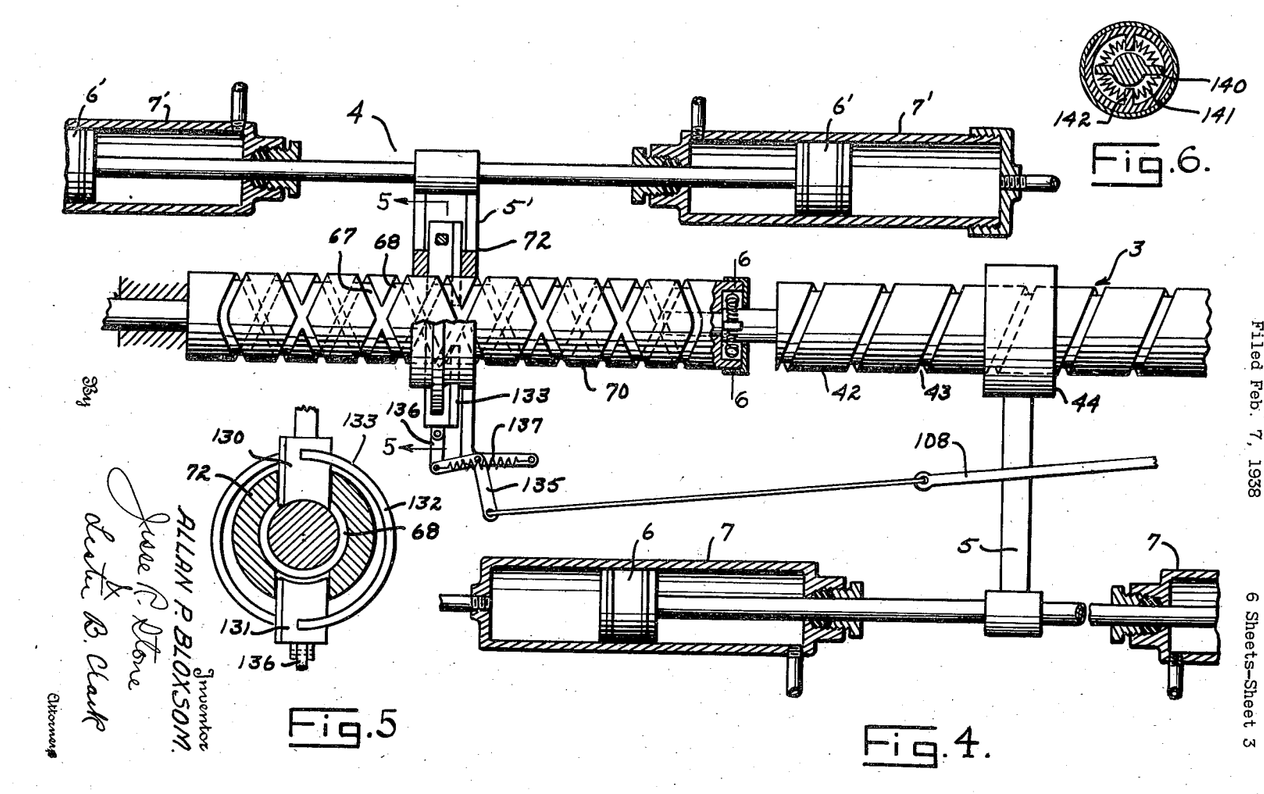
Fig. 4 is a view partly in section showing another embodiment of mechanical construction in the invention.
Fig. 5 is a cross section taken on line 5—5 of Fig. 4.
Fig. 6 is a cross section taken on the line 6—6 of Fig. 4.

The lower end of the steering shaft has a reduced section 50 which is releasably connected through a locking screw 51 to a shaft 52 which projects from the lower end of the driving sleeve 42 to drive the secondary mechanism 4, an embodiment of which is shown in each of Figs. 2 and 4.

Referring to the embodiment shown in Fig. 2 the lower end of the shaft 52 is journaled at 53 upon the vehicle and carries a driving assembly which includes conical end blocks 56 which are splined upon the shaft 52 and which are provided with circumferential grooves 57 to receive pins 58 in a yoke 59 whereby the blocks 56 may be moved in unison longitudinally of the shaft 52 to serve a purpose that will be made apparent.

Intermediate the end blocks 56 a segmented sleeve 70 surrounds the shaft 52 and has on its periphery screw threads 67 and 68 which extend in opposite directions and join at the ends of the sleeve at 69. Such construction is well known as comprising a reversible thread drive in which a driving block may be driven by either of the threads 67 or 68 and directed to the other series of threads at the juncture point 69.

The mechanism thus far described drives the arm 5' through a driving block 71 fixed within the collar 72 integral with the arm 5'. Direction of the driving block 71 within the threads 67 and 68 is instrumental in obtaining the desired coordination of steering of the front and rear wheels.

In order to obtain the desired direction of the driving block 71 the sleeve 70 is broken into end segments 75 and 76 and a central segment 77. Segment 77 is fixed to the shaft 52 while the end segments 75 and 76 are splined thereto. These segments 75 and 76 are also connected to the respective blocks 56 and hence will move longitudinally of the shaft with movement of the blocks. Cooperating with the segmented sleeves 70 are pairs of complementary guiding blocks 80 and 81 adapted to be alternatively interposed between the respective segments 75 and 76 and the segment 77 of the sleeve 70. The complemental blocks of each of the pairs 80 and 81 form a cylindrical segment having a thread segment as shown at 82 of the same configuration as the juncture of the threads 67 and 68 at the point 69.

Each pair of guide blocks 80 and 81 is an element of a guide block cage which includes a collar 90 through which project pins 91 provided with cylindrical head portions 92 to slidably receive arms 93 which are urged outwardly therefrom by means of compression springs 94. Secured to the ends of arms 93 are the respective blocks 80 and 81. The conical blocks 56 are slotted at 95 (see Fig. 3) to admit a tension spring 96 passing through an opening 97 in the shaft 52 and attached to the inner ends of the pins 91. With this construction it is believed apparent that inward movement of either of the conical blocks 56 will cause the associated pins 91 to ride upon the conical surface of such block and hence to cause the accompanying guide blocks 80 or 81 to move outwardly from the shaft 52. At the same time inward movement of one of the conical end blocks 56 will cause the adjacent end segment of the sleeve 70 to move inwardly into juxtaposition with the segment 77 fixed to the shaft 52.

In Fig. 7 is shown a steering control assembly 100 through which the secondary steering assembly 4 is controlled. This assembly comprises intermeshing gears 101, 102 and 103 to which are attached control stops 104, 105 and 106, gear 102 being additionally provided with an arm 107 pivotally connected to the rod 108. The opposite end of the rod 108 is connected at 109 to one end of a lever 110 centrally pivoted at 111 on the frame of the vehicle. A tension spring 112 attached at 109 serves to hold the linkage in a fixed terminal position when the rod 108 is moved to the right or left by the actuation of the arm 107.

Lever 110 is also shown in Fig. 2 wherein a connecting link 113 is shown as connecting the other end of the lever to the yoke 59. It is believed obvious that the position of the conical end blocks 65 is determined by actuation of the rod 108. Referring again to Fig. 7 the steering shaft 40 is provided with threads 125 which engage complementary threads in the collar 126 provided with a downwardly extended arm 127 having a projection 128 adapted to engage the arms 104, 105 and 106 of the control assembly 100 and hence to drive the associated gears whereby the desired actuation of the rod 108 is effected. If for example the arm 127 is moved to the left, pin 128 will engage the downwardly extending stop 104 and rotate the gear 101 in a clockwise direction to drive the gear 102 in a clockwise direction so that the rod 108 will be moved to the left to effect a function that will be more fully described. As the arm 127 moves back to the position indicated in the drawings, gear 101 will again be turned but in a clockwise direction by virtue of the engagement of the pin 128 with the other stop 104 which was previously moved to a vertical position. Such functioning will return the rod 108 to its initial position. If the arm 127 is moved to the right and returned, similar movement of the rod 108 will take place.

In the operation of the device just described it will be assumed that the parts are in the relative positions shown in Figs. 2 and 7. It will also be assumed that the steering wheel is to be turned in a counterclockwise direction as viewed from the right in each of these figures in order that the vehicle will be directed to the left, as indicated in Fig. 11.

Initial turning of the wheel 2 will cause the arm 5' to be moved to the left (Figs. 1, 2 and 4) and hence the rear wheels will be directed outwardly at an angle proportioned to such initial turning of the steering wheel up to the point where the driving block 71 reaches the flexure in the threaded segment 82 in the guide blocks 80. Further turning of the steering wheel within a limited angle will cause the arm 5' to be moved to the right along the segment 76, as viewed in Figs. 1, 2 and 4, and hence to direct the rear wheels in the direction indicated by the line 31 in Fig. 11. At the same time the arm 127 will be moving to the left (Fig. 7) and the gear wheel 101 will be rotated in a clockwise direction and drive gear wheel 102 with its associated arm 107 to shift the conical end blocks 56 to the right so that the guide blocks 81 will be positioned adjacent the threaded segment 77 of the sleeve 70 and driving block 71 will be directed by the threaded segment 82 in these guide blocks. Continued turning of the steering wheel will carry the driving block past the flexure in the threaded segment in guide blocks 81 and additional turning thereafter will then cause the arm 5' to again move to the left along the segment 75, as viewed in Figs. 1, 2 and 4, and the rear wheels will assume a path illustrated by the line 32 in Fig. 11.

If the steering wheel 2 is turned clockwise instead of counterclockwise as just assumed, initial turning of the wheel will direct the rear wheels oppositely to the change in direction indicated by the line 29 in Fig. 11. The arm 127 will move to the right and projection 128 will engage control stop 105 whereupon the rod 108 will be moved to actuate the control assembly so that guide blocks 81 will be positioned between threaded segments 76 and 77. As the driving block 71 passes the flexure in the thread 82 the rear wheels will be turned oppositely to the change in direction shown by the line 31 in Fig. 11.

In a similar manner continued turning of the steering wheel will cause arm 127 to engage stop 106 and gear 103 and actuate the control assembly to place the guide blocks 80 in the position shown in Fig. 2 so that drive block 71 will move through the flexure in the thread segment 82 in these guide blocks and the direction of the wheels will be changed oppositely to that shown by line 32.

It is apparent that the functioning just outlined will take place in reverse order as the steering wheel 2 is again returned counterclockwise to bring the wheels to the straightaway position.

An alternative construction for obtaining the desired coordination in steering of the front and rear wheels is illustrated in Fig. 4 wherein the sleeve 70 is of unitary construction, the arm 5' being provided with a composite drive collar 72 whereby the desired driving connection between the arm 5' and the threaded sleeve 70 will be obtained. In this embodiment the collar 72 is provided with a pair of driving blocks 130 and 131, passing through radial openings in the collar 72 and interconnected by means of semi-circular arms 132. The assembly 133 thus formed is such that it may be shifted transversely of the sleeve 70.

The driving blocks 130 and 131 are oppositely biased and spaced so that when the assembly is shifted to its indicated position the driving block 130 will be in engagement with the thread 68 while the driving block 131 will be lifted clear of the sleeve 70. The position of the assembly 133 is determined by the control assembly 100 which as above indicated actuates the rod 108. In this embodiment the rod 108 is connected to a bell-crank lever 135 having its opposite end connected by link 136 to the assembly 133. The spring 137 retains the assembly 133 in a terminal position until such position is altered by operation of the control assembly 100.

Assembly 133 is so designed that each of the driving blocks 130 and 131 engages its cooperating thread as the assembly is being shifted from one terminal position to the other. Such condition tends to lock the steering assembly momentarily. The sleeve 70 is rotatably mounted upon the shaft 52 which is provided with projections 140. A spring 141 is connected alternately to these projections 140 and complementary projections 142 internally of the sleeve 70, thereby providing a resilient connection to overcome the instantaneous locked position just referred to.

When the embodiment of Fig. 4 is used, control assembly 100 is provided with an additional gear 101' (Fig. 13) which meshes with the gear 101 and which may be engaged by the projection 128 on the arm 127 in the manner previously described. The control assembly therefore operates in a manner similar to that described in connection with Fig. 2. In this embodiment however the two flexures in the line illustrating the changes in direction of the rear wheels (Fig. 11) are obtained by the coaction of the projection 128 on the arm 127 successively with the blocks 104 and 104' on the gears 101 and 101'.

When parking the vehicle it is desirable that both the front and rear wheels be turned in a common direction in order that the vehicle will be directed effectively into the parking area. In order that such functioning may accrue in accordance with the present invention the control assembly 100 is provided with a manually operable control member 150 within reach of the driver whereby the journal members 151 and 152 may be moved outwardly a sufficient distance that the associated gears 103 and 104 will be moved from engagement with gear 105.

If then the steering wheel 2 is rotated counterclockwise to turn the vehicle to the left, the front wheels will assume the successive positions indicated by the lines 26', 28', 35 and 35' in Fig. 12. The rear wheels will assume slightly different positions as indicated by the lines 27', 29', 31' and 36. The initial departure of the rear wheels from the straightaway line 27' occurs as the driving block 71 approaches the flexure in the thread segment 82 in the guide blocks 80 while the succeeding position 31' results from movement of the driving block 71 along the thread 69 after the flexure has been passed.

If the steering gear 2 is turned clockwise for parking to the right as the vehicle moves forward, the front wheels move oppositely to the lines 26', 28', 35 and 35' in Fig. 12. There is a similar opposite movement of the rear wheels to that shown by the lines 27' 29', 31' and 36, the reversal of direction between lines 29' and 31' taking place by virtue of the fact that the arm 127 in moving to the right (Fig. 7) engages downwardly extending arm 105 on the gear 102, whereby the guide blocks 82 are shifted to operative position and the driving block 71 causes reversal as it passes thru the flexure in the thread segment in these guide blocks.

It is obvious that whether the steering wheel be turned to the right or left for parking, the respective wheels are brought successively, in reverse order, thru the positions just described as the steering wheel 2 is turned to bring the wheels to the straightaway position.

In event of disability of either of the steering assemblies above described, it is desirable that provision shall be made whereby the vehicle may be directed by the other assembly. To provide such functioning each of the driving assemblies is attached to steering shaft 40 through a releasable connection as illustrated in Figs. 7 and 8. With this construction it is believed apparent that the respective assemblies may be disconnected from the steering wheel 2 by releasing one or the other of the locking screws 41 and 51.

Figures 9, 13:
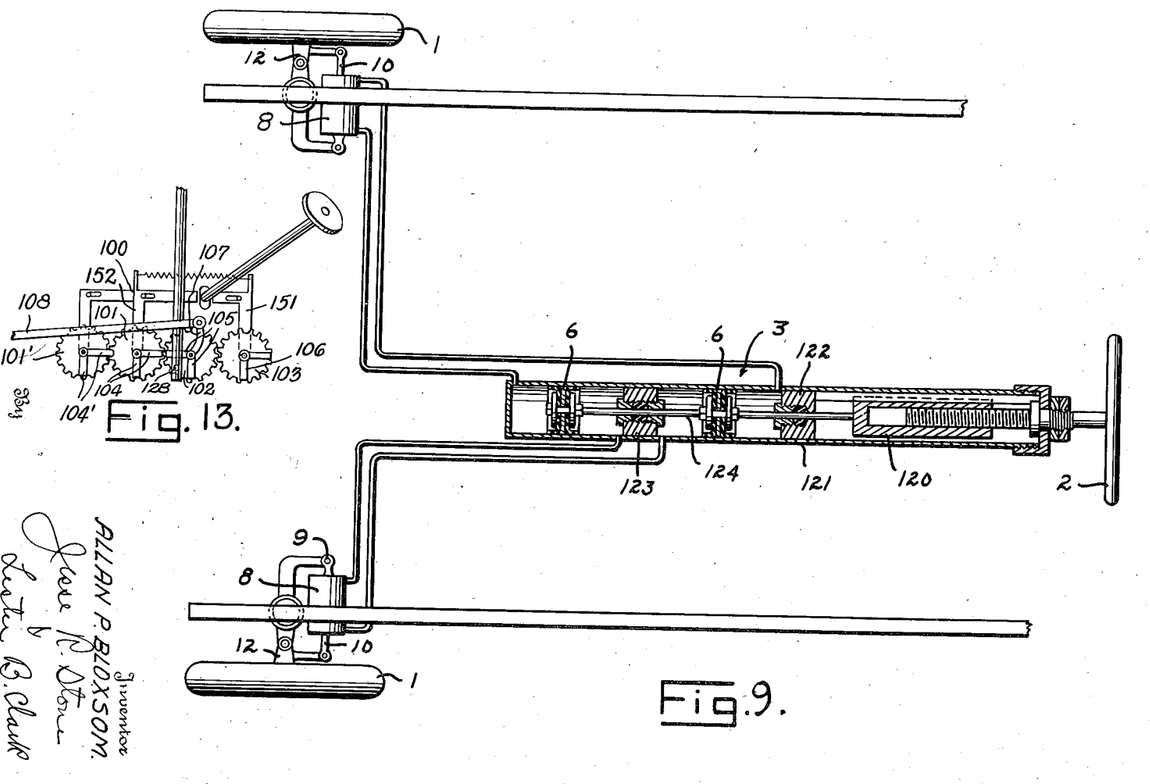
Fig. 9 illustrates an alternative embodiment of the primary steering mechanism of the invention.
Fig. 13 shows the modified control assembly used with the construction of Fig. 4.

An alternative embodiment of the primary steering mechanism is illustrated in Fig. 9 wherein the steering wheel 2 is adapted to actuate a yoke 120 within a continuous cylinder 121, having spaced partitions 122 and 123 which are apertured to sealably pass a piston rod 124 carrying the pistons 6. When using this alternative embodiment the secondary steering mechanism may be operatively connected in any suitable manner to the steering wheel 2 for conjoint action therewith.

Figure 10:
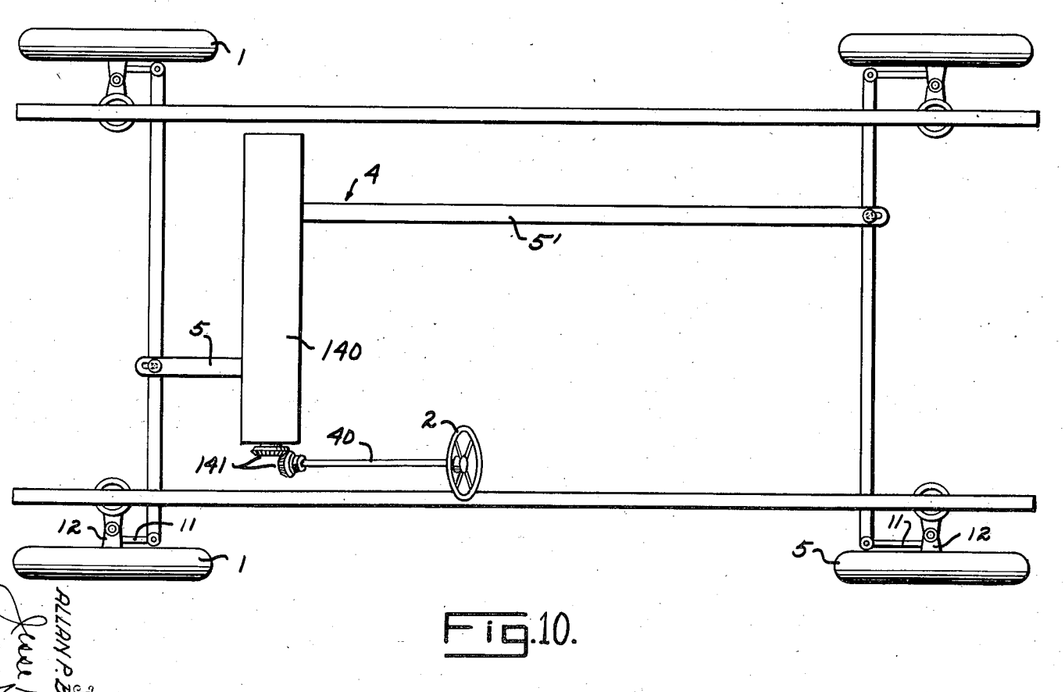
Fig. 10 illustrates an alternative orientation of the steering mechanism with the chassis of the vehicle.

While the foregoing description is directed to a construction which includes a hydraulic mechanism for imparting steering motion to the vehicle wheels, the invention is not confined thereto as it is intended that such movement may be mechanically imparted from the arms 5 and 5' to cooperating mechanism for turning the wheels 1 and 5 about their spindles 9. Such construction is illustrated in Fig. 10 which also shows the major elements of the mechanism enclosed within a housing 140 transversely of the vehicle frame and driven through beveled gears 141 one of which is attached to the steering shaft 40.

What is claimed is:

1. A steering mechanism for a motor vehicle including primary and secondary steering assemblies operatively connected to a steering wheel whereby the relative directions of the front and rear wheels may be controlled, said steering assemblies being constructed and arranged to turn the front and rear wheels in opposite directions when turning the vehicle on a large radius of curvature and including automatic means to turn the front and rear wheels in a common direction when turning the vehicle at a predetermined smaller radius of curvature.

2. A steering mechanism for a motor vehicle including primary and secondary steering assemblies operatively connected to a steering wheel whereby the relative directions of the front and rear wheels may be controlled, said steering assemblies being constructed and arranged to turn the front and rear wheels in opposite directions when turning the vehicle on a large radius of curvature, and including automatic means to turn the front and rear wheels in a common direction when a predetermined smaller radius of curvature is reached, and to thereafter automatically turn the front and rear wheels in opposite directions for additional decrease in the turning radius.

3. In an automotive vehicle the combination of a primary steering assembly for directing the front wheels of the vehicle, a secondary steering assembly for directing the rear wheels of the vehicle, a steering unit operatively connected to both of said assemblies, a steering wheel for driving said unit, said steering unit including means for actuating the primary steering assembly to turn the front wheels in accordance with the turning of the steering wheel, and means responsive to the rotational movement of the steering wheel from the straightaway position for actuating the secondary steering assembly to successively turn the rear wheels outwardly, substantially parallel with and thereafter increasingly outwardly relative to the front wheels.

4. In an automotive vehicle the combination of a primary steering assembly for directing the front wheels of the vehicle, a secondary steering assembly for directing the rear wheels of the vehicle, a steering unit operatively connected to both of said assemblies, a steering wheel for driving said unit, said steering unit including means for actuating the primary steering assembly to turn the front wheels in accordance with the turning of the steering wheel, means responsive to the rotational movement of the steering wheel from the straightaway position for actuating the secondary steering assembly to successively turn the rear wheels outwardly, substantially parallel with and thereafter increasingly outwardly relative to the front wheels and manually operable means for controlling the operation of said last mentioned means to direct the rear wheels in a common direction with the front wheels.

5. In an automotive vehicle the combination of, a primary steering assembly for directing the front wheels of the vehicle, a secondary steering assembly for directing the rear wheels of the vehicle, a steering shaft, a steering wheel on said shaft, means operatively connecting said shaft to the primary steering assembly, and a reversing mechanism operatively connected to said shaft and said secondary steering assembly and operable by rotational movement of the steering wheel from the straightaway position to actuate the secondary steering assembly to successively turn the rear wheels outwardly, substantially parallel with and thereafter increasingly outwardly relative to the front wheels.

ALLAN P. BLOXSOM.